United States Patent [19]
Bosley

[11] Patent Number: 5,099,752
[45] Date of Patent: Mar. 31, 1992

[54] ENCLOSURE VENTILATION AND TEMPERATURE APPARATUS

[75] Inventor: David C. Bosley, Cincinnati, Ohio

[73] Assignee: Dynamic Educational Systems, Inc., Cincinnati, Ohio

[21] Appl. No.: 449,580

[22] Filed: Dec. 11, 1989

[51] Int. Cl.$^5$ .............................................. B60H 1/24
[52] U.S. Cl. .................................... 454/131; 454/140; 454/159
[58] Field of Search ...................... 98/2.02, 2.13, 2.05, 98/2.11, 40.18; 239/53, 54, 55, 56

[56] References Cited

U.S. PATENT DOCUMENTS

| | | | |
|---|---|---|---|
| 2,612,830 | 10/1952 | Kendrick | 98/2.02 |
| 2,780,928 | 2/1957 | Bullock | 62/117 |
| 2,922,293 | 1/1960 | Pelix | 62/243 |
| 2,962,951 | 12/1960 | Holmes | 98/2.02 |
| 3,034,414 | 5/1962 | MacCracken | |
| 3,360,954 | 1/1968 | Snider | |
| 4,179,896 | 12/1979 | Buchner | 62/7 |
| 4,385,549 | 5/1983 | Bauer | 98/2 |
| 4,546,693 | 10/1985 | McTaw, Jr. | 98/2 |
| 4,899,645 | 2/1990 | Wolfe et al. | 98/2.02 |

FOREIGN PATENT DOCUMENTS 97511 6/1983 Japan ...................................... 98/2.02

Primary Examiner—Harold Joyce

[57] ABSTRACT

A cooling device for an enclosure, specifically parked automotive vehicles, mountable in a window comprising an air channel for introducing normally cool ambient air from outside the vehicle into the vehicle passenger compartment. The atmospheric air channel is positioned so as to cause the ambient air to be forced to the bottom of the vehicle compartment. This introduction of new atmospheric air increases the internal pressure of the vehicle compartment causing the interior air to seek escape by the easiest means possible, such as, the open portion of the window surrounding the inlet of the device. Additionally during days of cooler ambient temperatures the device has a heating member (52) such that it can perform area heating. Further a coanda nozzle (16) is attached to the outlet (14) of the air channel which acts to speed the velocity of the air being forced to the bottom of the vehicle. This increase in air velocity is then utilized to impart some of its energy to the still air at the outside exit of the nozzle thereby increasing the overall exhaust air flow.

14 Claims, 7 Drawing Sheets

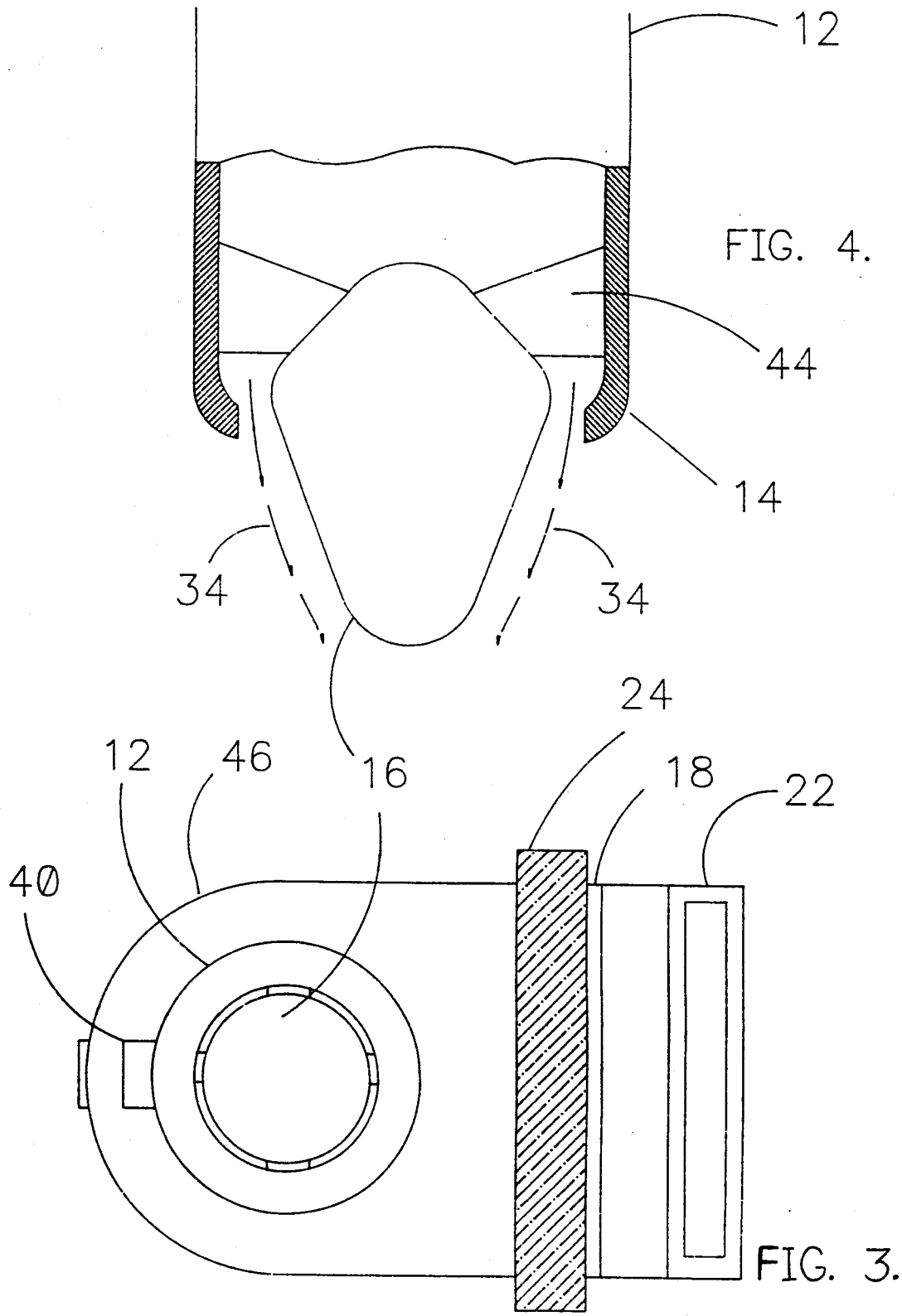

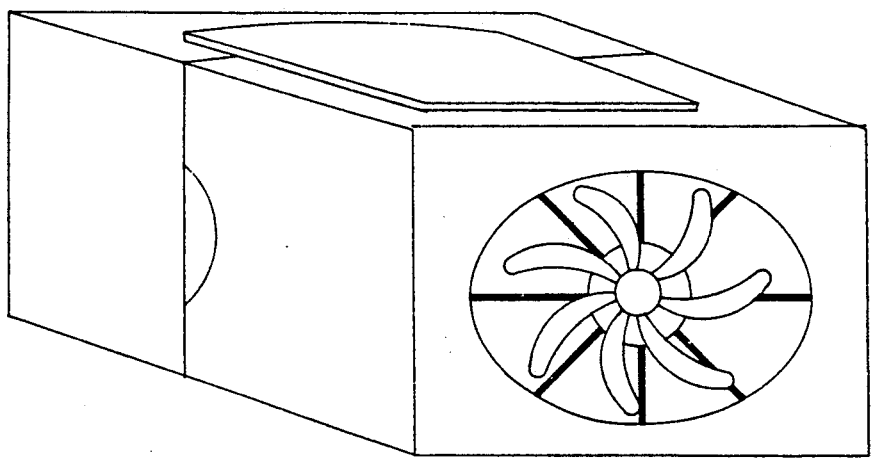
FIG. 7.
FIG. 8.
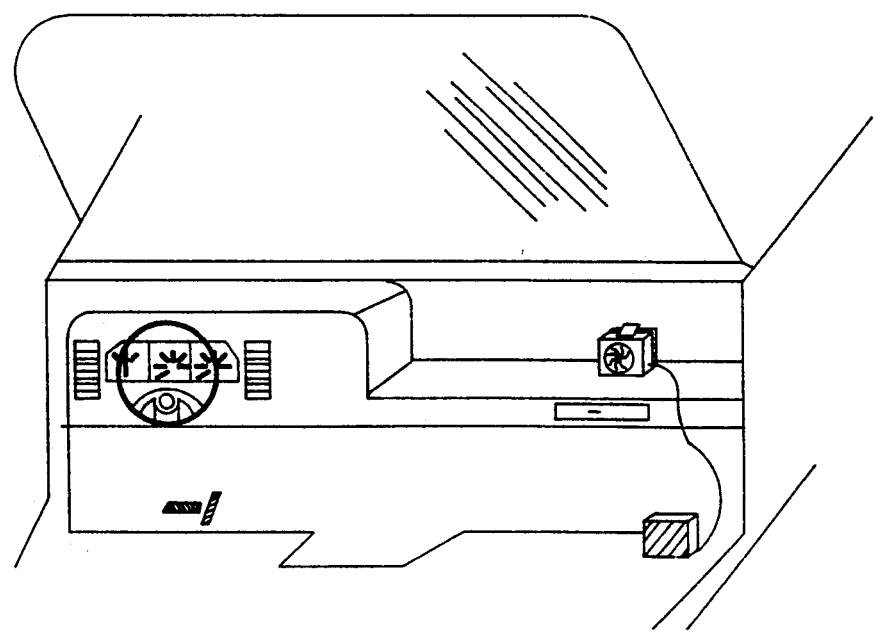

ENCLOSURE VENTILATION AND TEMPERATURE APPARATUS

FIELD OF THE INVENTION

This invention relates to a device for cooling or heating enclosures, such as automobiles by introducing cooler outside air into the interior of said enclosure for cooling or by energizing a heating element.

DESCRIPTION OF THE PRIOR ART

It is known in the prior art that, to prevent heat soaking of personnel enclosures, one or more of three modes of heat transfer must to some degree be retarded.

It is for this reason that many vehicle manufactures have simply suggested that, prior to departure, a heat soaked automobile be ventilated via the autos venting system for efficient cooling. The shortcoming of this suggestion is that many, if not all automotive vehicles require the keys to be in the ignition and the automobile to be on before the vent system will operate. Additionally, previous inventions for cooling of vehicle interiors required special coolants such as from in order to operate, which adds the maintenance expense of the device, as shown in U.S. Pat. No. 4,179,896 to Buchner. Further ecological studies have shown that freon specifically degrades the atmosphere by destroying the ozone layer.

U.S. Pat. Nos. 4,385,549 to Bauer and 4,546,693 to McTaw Jr. sought to reduce this heat build up of vehicle enclosures through convection by way of venting systems located in the front fender or window respectively. The short coming of these systems is their intricate installations and that they only actively remove heat if their vehicles are in motion relative to the ambient air.

U.S. Pat. Nos. 2,922,293 to Pelix and 2,780,928 to Bullock both disclose air-conditioning units which are mountable to partially open windows of vehicles. The trouble with these systems is that they both require the host vehicle to be on in order to efficiently operate.

In U.S. Pat. Nos. 3,034,414 to MacCracken and 3,360,954 to Snider there is disclosed devices for providing air-conditioned, and in one case, heated air for parked vehicles. Each device disclosed consists of a base unit and an arm which suitably attaches to the window of the vehicle in question. Unfortunately, the shortcoming of such an arrangement is that the base unit is permanently mounted to the ground and receives its conditioned air through a tube or series of tubes interconnected underground to a master heater, air-conditioner, or fuel supply. An arrangement such as this effectively nullifies portability of the unit.

Several other devices have been designed in the past. Most of these devices have suffered from the defects of loose parts, passive heat reduction, or heavy and bulky components, while others have suffered from low torque ineffective blowers that sought to pull cool air into the vehicle by means of the vent system. The flaw of this design is that it brought somewhat cooler outside air into contact with vents and duct-work which warmed with the rest of the vehicle to the point where this cooler outside air merely transported the heat of the duct-work into the interior of the vehicle.

Accordingly there is a need for a device which effectively cools the interior of an enclosure such as a vehicle while simultaneously reducing unpleasant interior odors. In addition, there is a need for a device which could provide interior heating in the same compact, lightweight, and portable package.

SUMMARY OF THE INVENTION

It is an object of the present invention to provide a cooling device that is also capable of heating small enclosures.

A further object of the present invention is to provide a cooling or heating device which is capable both of being mounted on a window or an intake vent and also capable of simply sitting stationary on a level surface.

Another further object of this invention is to provide a means to control the rate of heating and/or cooling with this device.

A further object of the instant invention is the addition of a delay circuit through which the life of the power source can be increased by suitably pulsating the on/off effect of the device.

A further object of the instant invention is the provision of the afore mentioned effects in a small and compact package.

A further object of the instant invention is to provide cooling in a fashion that significantly reduces harmful ecological effects produced by freon.

A further object of the instant invention is to provide cooling from the normally cooler outside air.

A further object of the instant invention is to provide a space at the top of the window to which the device is installed during the cooling mode and through which the hot and sometimes stale interior air can be forced out.

A further object of the instant invention is to provide a means whereby an air freshener's scent may be applied to the cooling air brought in from outside the enclosure.

A further object of the instant invention is to provide a means whereby exhaust airflow out of the device into the enclosure's interior increases in flow or velocity in order to expedite the cooling function of the device.

A further object of the instant invention is to provide a suitably light color base material for the body of the device to reflect larger amounts of radiant heat.

A further object of the instant invention is to provide a means by which cooler outside air may be directed to the lower level of the enclosure's interior.

Further objects and advantages of my invention will become apparent from a careful consideration of the drawing and ensuing description.

BRIEF DESCRIPTION OF THE DRAWINGS

In drawings closely related, figures have the same number but different alphabetic suffixes

FIG. 3 is a bottom view of the apparatus.

FIG. 4 is a detailed section view of the dual cone nozzle restriction.

FIG. 7 is a perspective view of a second embodiment of the apparatus shown from the left-side.

FIG. 8 is a front view of the apparatus of the second embodiment installed on a vehicle's dashboard vent.

DESCRIPTION OF THE PREFERRED EMBODIMENT

Figure 1A:
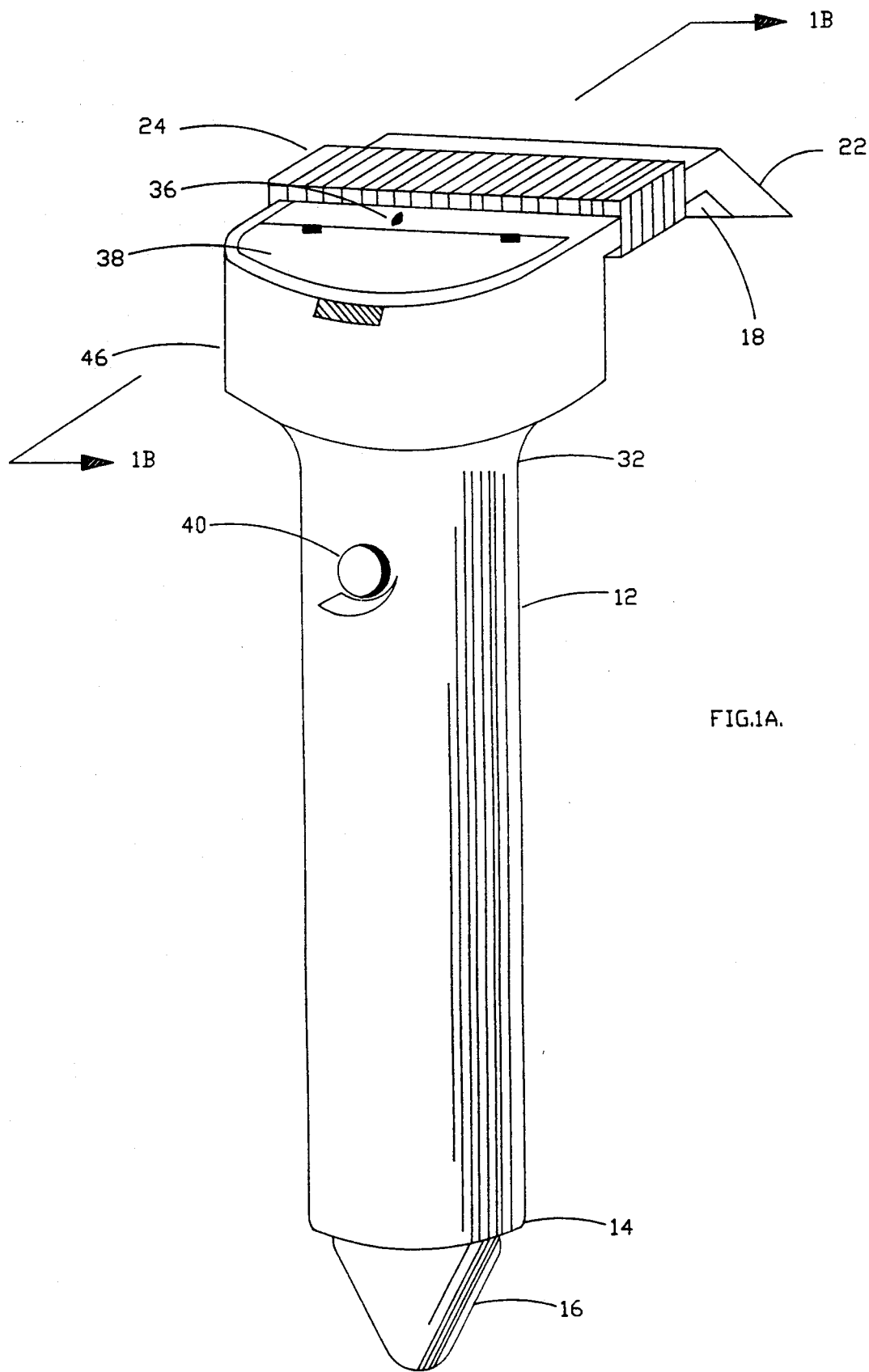
FIG. 1A is a perspective view of the entire device from the right-side.
Figure 1B:
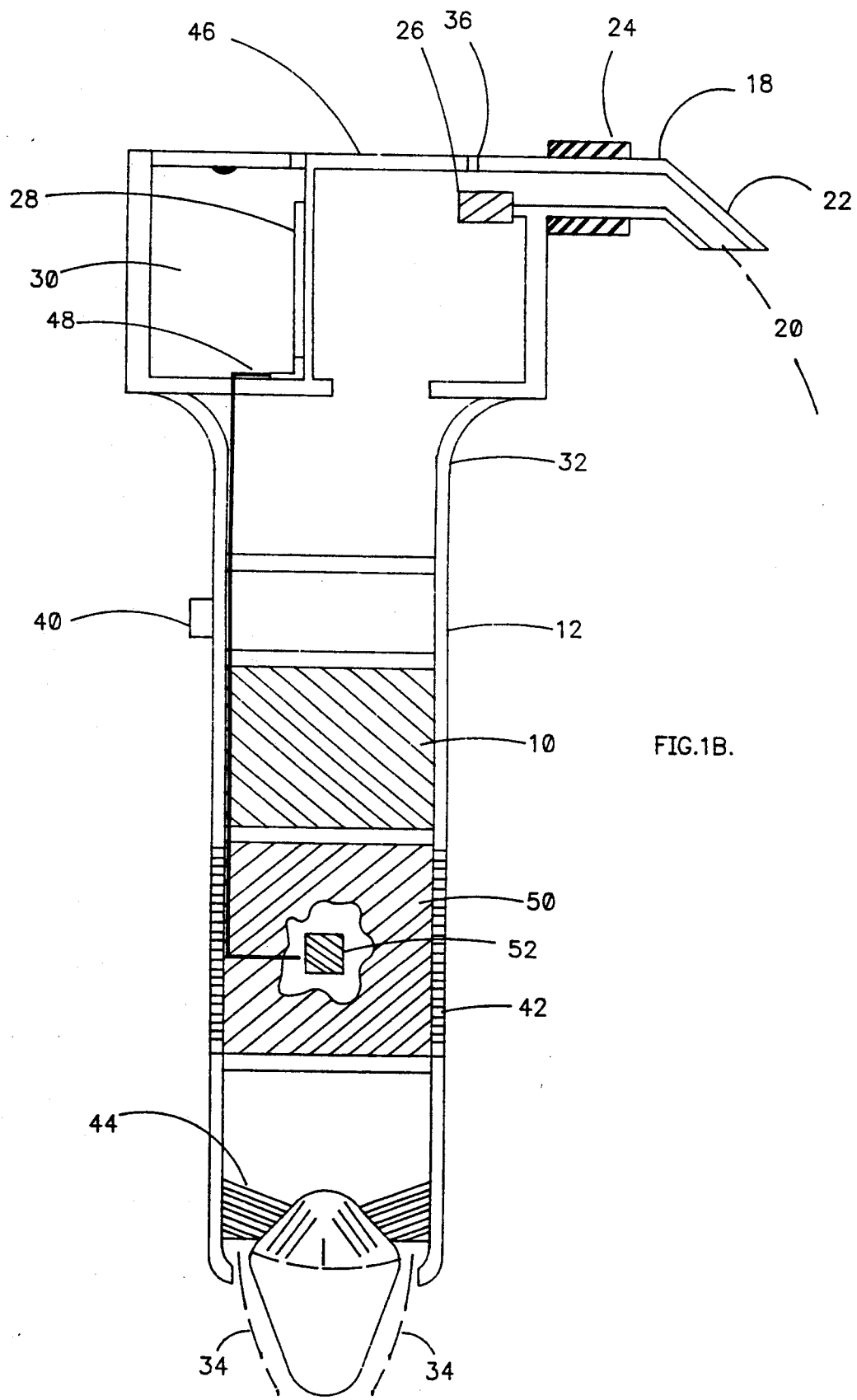
FIG. 1B is a right-side sectional view of the entire apparatus.
Figure 2:
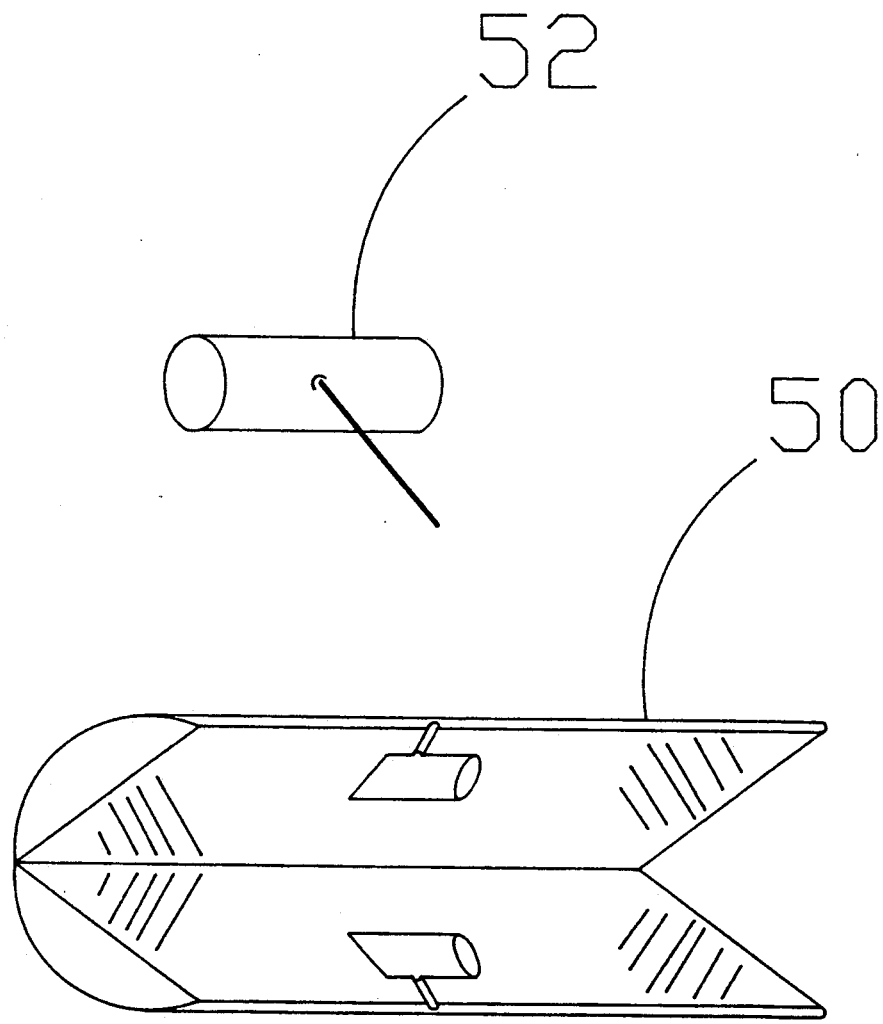
FIG. 2 is an open section view of the heat sinking structure with the heating member core.

The ventilation system and temperature apparatus of the present invention is best shown in FIG. 1B and typically consists of a channel 12, an air intake 22, an intake hook 18, an intake channel 32, an outlet nozzle 14, a dual cone nozzle restriction 16, batteries 30, an on/off delay knob 40, a delay control circuit board 28, and a fan 10. The intake 22, like the channel 12, the intake hook 18, and the intake channel 32, are all bonded, fastened or bound together in suitable fashion to provide an air restricting seal, yet allows for an ease of disassembly for maintenance. As shown in FIG. 1A the intake 22 is a wide cord flat open mouthed structure suitably angled downward at approximately 45 degrees in order to prevent most horizontally or downward moving particles from entering to possibly damage the device. Also, the intake 22 is designed as flat as possible to provide an appropriate entry way for supply air to the internal fan 10, and to restrict any prying member that could be wedged into the window's opening.

The intake 22 makes up the initial width and thickness of the intake hook 18. To increase the seal of the intake hook 18 fixtures the device in place after the window is tightened upon it, and a resilient foam 24 is placed around the intake hook 18. This intake hook 18 has at its top-center a hole which is air freshener port 36. Internal to the intake hook 18 and directly below air freshener port 36 is the absorbent foam filter 26. This absorbent foam filter 26 is fixed to the interior of intake hook 18 below the air freshener port 36. As shown in FIG. 1A, intake 22, intake hook 18, and the intake housing 46 are typically cast as subcomponents for later assembly to battery bank lid 38, and intake channel 32.

FIG. 1B shows the location of the batteries 30 and the associated terminal strip 48 delays control circuit board 28 connected to both. This assembly is inserted into the battery bank cavity of the intake housing 46 and typically screwed in place. This subassembly is then sealed through the means of suitable lip flanges to the intake channel 32. The delay control circuit board 28 is then connected to the on/of delay knob 40 by leads which are typically soldered to their appropriate terminal strip points 48 that reach to the mounting location of the on/off delay knob 40 on the upper center portion of the channel 12. Also making connection to the appropriate leads off of the delay control circuit board 28 and the batteries 30, is the fan 10. As shown in the lower portion of FIG. 1B the mount for heat sinking structure 42 is mounted below the fan 10 inside the bottom quarter of the channel 12. The area below the mount for heat sinking structure 42 is best depicted by FIG. 4 which is a view in section of the dual cone nozzle restriction 16 and surroundings. At the position where the channel 12 starts to diminish in diameter there are four equally distant restriction spacers 44 mounted to the inside wall of referenced channel 12. Connected to these four restriction spacers 44 is the body of the top half of the dual cone nozzle restriction 16. This dual cone nozzle restriction 16 is positioned in such a way as to fix the common base of the two cones which are joined together and comprise the dual cone nozzle restriction 16 approximately 3 millimeters above the remaining annular opening of the outlet nozzle 14.

OPERATION OF INVENTION

Figure 5:
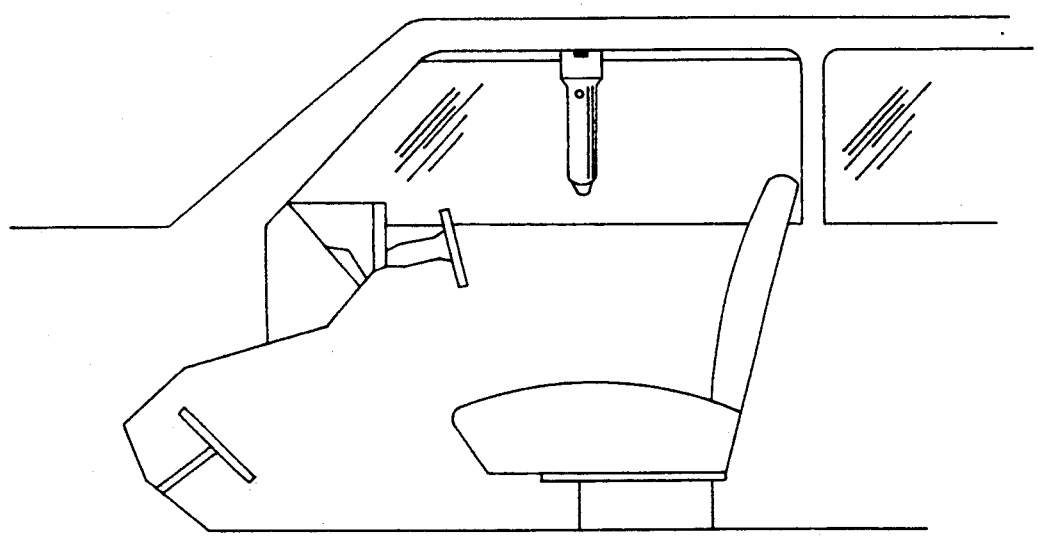
FIG. 5 is a front view of the apparatus installed in a vehicle for cooling.

The manner of operation of the apparatus having the above mentioned construction is represented in FIG. 5. Assuming the device is mounted as illustrated in FIG. 5, and the ambient environment has, as is typical for a hot sunny day, heated the vehicle's interior to a much greater temperature than the exterior, the apparatus is switched on. Once the apparatus is switched on, by the on/off delay knob 40, the delay control circuit board 28 demands the fan 10 to turn at a specified rate. This draws ambient air into the intake housing 46 via the intake 22 and the intake hook 18. This inlet air 20 is then directed down the channel 12 through the fan 10 to the dual cone nozzle restriction 16. The dual cone nozzle restriction 16 then splits the air flow down the center before allowing it to continue out the annular outlet nozzle 14. This air flow out of the outlet nozzle 14 is shown as the outlet air 34. While I believe that the thin annular outlet nozzle 14, as configured with the dual cone nozzle restriction 16 center body, causes the exiting air flow to move according to the Coanda Effect, I don't wish to be bound by this. The Coanda Effect causes the overall air flow from the device to increase similar to the impulse principle. This is evident upon examination because the form of the exit nozzle acts to increase the velocity of the air blown by the fan 10.

This high velocity exit air blown by the fan 10 then follows the general contour of the lower half of the dual cone nozzle restriction 16 due to boundary layer and laminar air flow principles. But upon making contact with the static air exterior to the device this high velocity airstream sacrifices some of its velocity by forcing some of this still air into motion. Hence increasing the overall flow.

As can be seen in FIG. 1B a scented air freshener can be added to the ambient air simply by placing a few drops of any liquid air freshener through the air freshener port 36 into the absorbent foam filter 26 located in the upper intake housing 46.

It is also possible for the aforementioned apparatus to provide area heating during cooler environmental conditions. For this arrangement the apparatus is typically placed on a floor or seat resting on the intake hook 18 as shown in FIG. 3. Once the apparatus is switched on by the on/off delay knob 40 being turned fully clockwise the delay control circuit board 28 demands both the fan 10 to switch on, and the heating member 52 mounted in the core of the heat sinking structure 50 on. Once the fan 10 is on this draws area air into the intake housing 46 via the intake 22 and the intake hook 18. This area air is then directed up the channel 12 through the fan 10 to the heat sinking structure 50 at the mount for heat sinking structure 42.

This heat sinking structure 50 is cylindrical in shape and isolatedly fixed to the mount for heat sinking structure 42. The heat sinking structure 50 should have a high coefficient of thermal conductivity and a large surface area, and is therefore preferably constructed from a metal having a reticulated open-cell geometry such as Duocel brand foam metal; Duocel is a trademark of Energy Research and Generation, Inc. Oakland, California. At the core of this cylindrical heat sinking structure 50 is a heating member 52. This heating member 52 can consist of a typical resistance type heating element which is controlled by the delay control circuit board 28. This heating member 50 is energized by batteries 30 such that upon being powered to produce heat it transfers this heat to the heat sinking structure 50 for further transfer to the exhaust air passing from the fan 10 as this exhaust air passes over the open cell surface area of the heat sinking structure 50. After being heated by the heating member 52 air is then split down the center by the dual cone nozzle restriction 16 before allowing it to pass on and out the annular outlet nozzle 14.

In the embodiment shown and herein described, the exit outlet nozzle 14 is described as imparting the Coanda Effect for increasing the flow of air from the device. However the apparatus is in no ways limited to this specific arrangement for forming the outlet nozzle 14 as the velocity increase and hence the flow of the air through and from the apparatus respectively can also be achieved by an outlet nozzle with a suitably decreasing diameter and no dual cone nozzle restriction 16.

Figure 6:
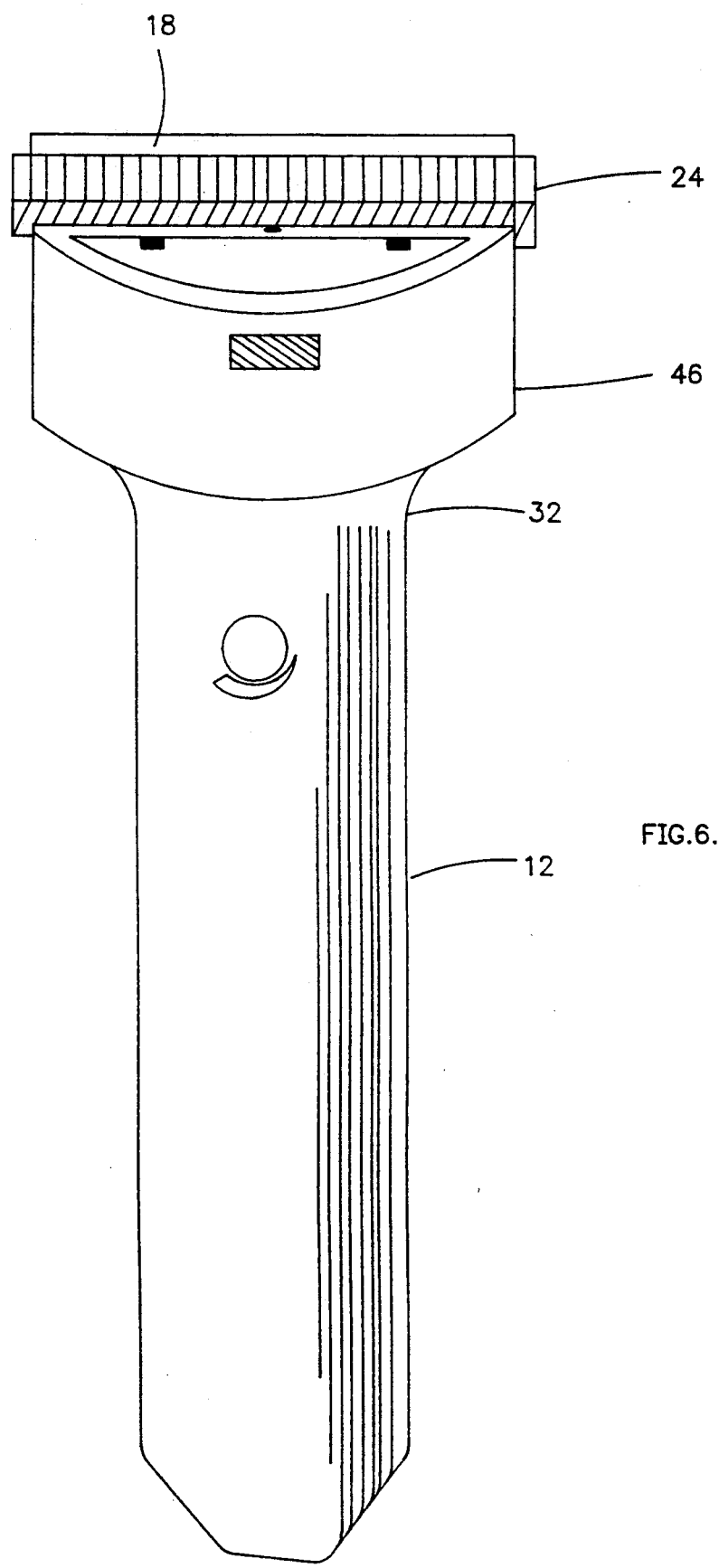
FIG. 6 is a front view of the apparatus with the nozzle restriction removed.

Since the removal of this dual cone nozzle restriction 16 as shown in FIG. 6 would delete the need for the restriction spacers 44 it would also increase the overall reliability of the apparatus. Shown in FIGS. 7-8 is another embodiment of the primary invention which is in the form of a dual cube connected by a power and control cord. This arrangement allows the device to be mounted simply to the vent arrangement of the host enclosure by means of Scotch-mate-brand hook and loop fasteners; Scotchmate is a trademark of 3M Co. Detroit, Mich. Then the apparatus can be hooked over a partially open window or vent. As shown the fan blades are configured in a scimitar, short curved, arrangement in order to reduce blade tip loses and to increase efficiency.

CONCLUSION, RAMIFICATIONS, AND SCOPE OF INVENTION

There are many advantages of the ventilation and temperature apparatus of the present invention. For example the apparatus is compact and portable providing an ease of installation and removal. Also the use of the fan to move the air makes the unit an active ventilation and temperature device. In addition cooling of the enclosure takes place by simple forced convection. In other words the operation of this apparatus is based upon the general principles of thermodynamics in an open system, a system where there is an interchange of matter between the enclosure and its surroundings. This interchange is from hot to cold where hot air rises and cool air falls. Thus it is in keeping with natural occurrences that the cooler ambient air brought into the enclosure by the apparatus is forced downwards. Likewise, it is by natural occurrence that the warmer interior air is forced upwards before being forced out the open window due to the increase in interior pressure.

While the form of apparatus herein described constitutes a preferred embodiment of this invention, it is to be understood that the invention is not limited to this precise form of apparatus. For example, louvers can be added to the device of the second embodiment.

Additionally, the apparatus can be manufactured in pastel or suitably light colors thereby increasing the radiant heat reflectivity of the device. Accordingly, it is known that changes may be made herein without departing from the true scope of the apparatus as expressed by the appended claims and their legal equivalents.

What I claim is:

1. An apparatus for ventilation and heating of passenger vehicle enclosure, at least one window for an atmospheric air passageway, said apparatus comprising:

a. an air channel having an air passageway therethrough and an intake aligned at approximately 90 degrees to said channel and an outlet nozzle at the distal end of said passageway, said air channel being detachably mountable to a nearly fully raised enclosure window top by intake hook means at an opening over said window of said enclosure to be ventilated;

b. a fan mounted in a lengthways center of said air channel to force air through said air channel and through said outlet nozzle to a lower most portion of said enclosure;

c. a heat sinking structure mounted at an atmospheric air exhaust of said fan, a heating member being mounted in the core of said heat sinking structure to cause normally sensible heat to be sunk by said heat sinking structure, said outlet nozzle being positioned downstream from said heat sinking structure.

2. The apparatus of claim 1 wherein said outlet nozzle comprises a dual cone nozzle restriction centered in said outlet nozzle, said dual cone nozzle restriction maintaining an annular outlet around one cone perimeter.

3. The apparatus of claim 1 wherein said outlet nozzle includes: a diameter reducing nozzle comprising:
   a dual cone nozzle restriction; and
   spacer means to center said dual cone nozzle restriction in an outlet of said diameter reducing nozzle such that said dual cone nozzle restriction creates a thin annular exit for exhaust air around a perimeter of a lower most cone of said dual cone nozzle restriction.

4. Apparatus of claim 1 wherein said fan includes:
   a delay control circuit board; and
   an on/off delay knob;
   said fan having said on/off delay knob as a control means for said delay control circuit board such that said fans can be controlled by delayed time.

5. Apparatus of claim 1 wherein said intake hook means comprises:
   an intake approximately ⅛ to ½ inches high and approximately 4 inches wide.

6. The apparatus of claim 1 wherein said intake hook means is covered around its width in a resilient foam such that said window of said enclosure is protected against glass chipping.

7. The apparatus of claim 6 wherein said intake hook means has a small portal means for providing an air freshener to atmospheric air within said intake hook means.

8. The apparatus of claim 7 wherein said intake hook means has an absorbent foam seat mounted internal to said intake hook means and aligned with said portal means to retain said air freshener and absorb any moisture that enters the intake.

9. The apparatus of claim 1 wherein said fan comprises an axial blowing fan.

10. The apparatus of claim 1 wherein said air channel is composed of a material that absorbs very little radiant heat.

11. The apparatus of claim 10 wherein said material is white in color.

12. The apparatus of claim 1 wherein said air channel is composed of a plastic material that can withstand various temperatures extremes.

13. The apparatus of claim 1 wherein said heat sinking structure is composed of aluminum.

14. The apparatus of claim 13 wherein said aluminum is porous.

* * * * *